United States Patent [19]

Nelson et al.

[11] Patent Number: 4,829,036

[45] Date of Patent: May 9, 1989

[54] REGENERATION PROCESS FOR SPENT $SO_2$-$NO_X$ SORBENTS

[75] Inventors: Brian W. Nelson, Kent; Sidney G. Nelson, Hudson, both of Ohio

[73] Assignee: Sanitech, Inc., Twinsburg, Ohio

[21] Appl. No.: 184,191

[22] Filed: Apr. 21, 1988

[51] Int. Cl.⁴ ........................ B01J 20/34; B01D 53/02
[52] U.S. Cl. ............................................ 502/50; 55/73; 55/74; 423/244; 423/239; 502/517
[58] Field of Search ............... 502/50, 38, 53, 517; 55/73, 74; 423/239 R, 244

[56] References Cited

U.S. PATENT DOCUMENTS

| | | | |
|---|---|---|---|
| 4,011,299 | 3/1977 | Henis et al. | 423/239 R |
| 4,323,544 | 4/1982 | Magder | 502/517 |
| 4,426,365 | 1/1984 | Magder | 423/239 |
| 4,692,318 | 9/1987 | Tolpin et al. | 423/239 |
| 4,721,582 | 6/1988 | Nelson | 502/517 |

Primary Examiner—Paul E. Konopka

[57] ABSTRACT

A process is disclosed for regenerating spent MgO-vermiculite and MgO-perlite sorbents, where the sorbents have been employed beforehand to remove sulfur and nitrogen oxides from flue gases. The regeneration process consists of a series of heating and cooling steps performed in controlled atmospheres during which time sulfur oxides and elemental sulfur are recovered, nitrogen oxides are destroyed, and the sorbents are returned substantially to their original condition.

8 Claims, 3 Drawing Sheets

MgO-Vermiculite

MgO-Perlite

REGENERATION PROCESS FOR SPENT $SO_2$-$NO_X$ SORBENTS

TECHNICAL FIELD

This invention relates to a process for generating flue gas sorbents and more particularly to a process for regenerating MgO-vermiculite and MgO-perlite sorbents employed to remove SO2 and NOx from flue gases.

BACKGROUND OF THE INVENTION

When coal or high-sulfur oil is burned, noxious gases, such as sulfur and nitrogen oxides, are generally given off. Substances called sorbents may be employed to sorb or remove these noxious gases from the flue gas emitted during burning. However, the abilities of sorbents to remove noxious gases after a while decrease, and eventually the sorbents become saturated. At this stage it becomes necessary to remove the sorbents, which are termed spent, from the system and to either discard them or to regenerate them. Regeneration is a process of restoring the sorbents to or near to their orginal condition.

Many sorbents are not readily regenerable. This is especially true of calcium-based sorbents, the sorbents most widely used today to treat utility powerplant flue gases. Regeneration, however, is a very desirable process because it eliminates the need for disposing of spent sorbents, which presents in many cases added environmental problems. Regeneration is also desirable from an economics standpoint. If a sorbent can be used over and over again, the relative cost of removing noxious gases from a flue gas can become very low.

Commercially pure magnesium oxide (MgO) mixed with water is known to have the ability to remove sulfur dioxide (SO2) from flue gases. The principles of all MgO wet scrubbing systems employed in the past are essentially the same (see M. Satriana, *New Developments in Flue Gas Desulfurization Technology*, Noyes Data Corporation, Park Ridge, N.J. 1981, p. 142). A magnesium-based water slurry is contacted with flue gas containing SO2. The SO2 is absorbed and forms an insoluble product. The mixture of scrubbing solution and product is then sent to a centrifuge where much of the scrubbing solution is separated from the product. The scrubbing solution is recycled, and the separated crystal cake product is conveyed to a dryer where additional water is driven off. The dried cake is then shipped to a separate regeneration facility where it is mixed with solid coke and the mixture is calcined at approximately 1000 C producing MgO, SO2, and CO2.

It was discovered recently that if MgO is reacted with and bonded to individual vermiculite or perlite particles and the combination are employed as sorbents, improved sorption performance over the performance of MgO-water slurries can be achieved. It was observed that the MgO-vermiculite and MgO-perlite sorbents can be used dry or nearly dry and that they will not only sorb SO2 effectively from a flue gas, but will remove NO2 and NO as well. The new sorbent compositions and their preparation are described in U.S. Pat. No. 4,721,582.

The unique dry nature of the new class of MgO-vermiculite and MgO-perlite sorbents permits them to be handled with relative ease, in comparison with MgO slurries. This is important during sorption, and it is particularly important during the regeneration process. With the new sorbents, no centrifuging is needed, corrosion problems are eliminated, energy requirements are minimized, and a completely closed system is possible.

The variables involved in regenerating the new sorbents were thoroughly investigated by the Inventors in a project supported by the U.S. Environmental Protection Agency in its Small Business Innovation Research (SBIR) Program. Several unexpected results were obtained in this project, and these results were incorporated in the regeneration process of the invention.

DETAILED DESCRIPTION OF THE INVENTION

Figure 1:
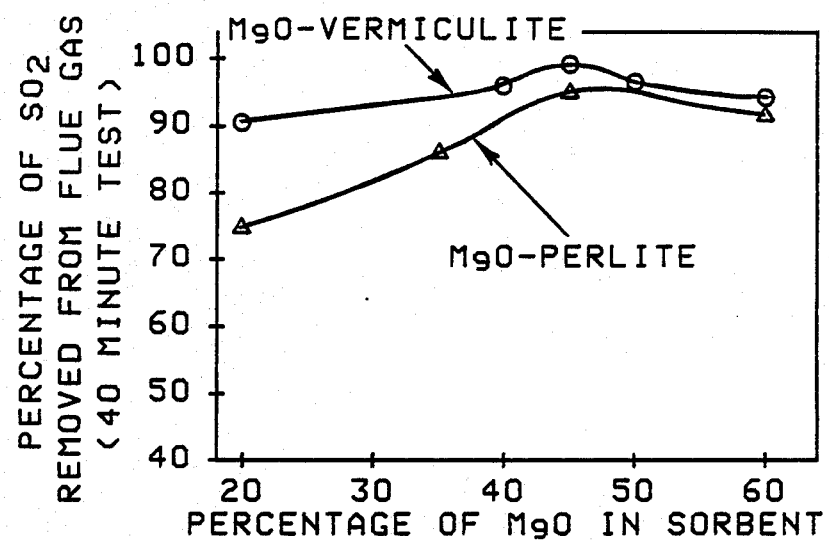
FIG. 1 shows how the sorption performance of fresh MgO-vermiculite and fresh MgO perlite sorbents varies with composition.

A sequence of processing steps are required to regenerate a spent MgO-vermiculite or a spent MgO-perlite sorbent to produce an effluent gas stream of a composition that has maximum economic value. In a continuous process, these steps involve successive levels of heating in selective atmospheres followed by cooling in air. The spent sorbent is first heated in air to a temperature in the range of 100° to 350° C. to drive off substantially all free and chemically attached water. It is then heated in an atmosphere containing either carbon monoxide or methane or hydrogen to a temperature in the range of 350° to 450° C. to drive off sorbed nitrogen oxides. Carbon monoxide, methane, and hydrogen are considered reducing gases. Of these gases, carbon monoxide is preferred. The second heating step is preferably carried out in an apparatus different than that used for the first heating step, but it can be performed in the same apparatus. The spent sorbent is then heated in the same environment to a temperature in the range of 450° to 700° C. to drive off approximately 90 percent of the sorbed sulfur oxides and to destroy substantially all of the nitrogen oxides expelled from the sorbent. In the latter case, the nitrogen oxides are reduced to gaseous nitrogen and carbon dioxide when carbon monoxide is used, or to gaseous nitrogen, carbon dioxide, and water when methane is used, or to gaseous nitrogen and water when hydrogen is used.

If 100 percent regeneration of the spent sorbent is desired, it was found advantageous to further heat the spent sorbent to a temperature above 700° C. in the same atmosphere, and preferably to a temperature in the range of 725° to 750° C. In so doing, it was found that all SO2 captured during sorption is released, that no traces of NOx in the expelled gases are detectible, and that the resulting regenerated sorbent often exhibits sorption abilities better than those of the original fresh sorbent, in terms of capacity to sorb SO2 per given weight of sorbent.

When the spent sorbents are heated to temperatures above 450° C., gases emanating from the sorbents include SO2, elemental sulfur, nitrogen, H2O, CO2 and residual CO, methane or hydrogen, whichever is used as or with the purge gas. All effluents are in gaseous form. Any one of a number of schemes can be employed to recover useful products from this stream. A preferred procedure is one in which the temperature of the gas initially is lowered to condense out elemental sulfur and H2O. This is followed by a staged compression step in which liquid SO2 is recovered first, followed by liquid or solid CO2. The remaining gas stream which contains essentially only nitrogen and residual reducing gas is recycled back to the regeneration vessel. An alternative procedure is one in which the SO2 is first separated from the gas stream by passing the gas through a water sorption column that removes the SO2. The SO2-containing water is then stripped of SO2 by heating. The resulting SO2 gas is dried with an H2SO4 column and is then compressed. In all cases, regeneration is completed within a period of about 15 to 30 minutes. After this time, the regenerated material is cooled to a temperature that will allow it to be readily handled, stored or reused. Normally this temperature is below 200° C. Cooling may be accomplished in any one of a number of atmospheres, but air is preferred.

In developing the process of the invention, it was learned that the composition of the sorbent, the temperatures of regeneration, and the atmosphere in which regeneration occurs all significantly affect the regeneration process and the performance of sorbents after regeneration.

The effects of changes in sorbent composition on initial SO2 sorption and on SO2 sorption after regeneration were observed when 12 compositions were examined. These compositions were:

(1) 100 percent Vermiculite
(2) 20 wt % MgO-80 wt % Vermiculite
(3) 40 wt % MgO-60 wt % Vermiculite
(4) 45 wt % MgO-55 wt % Vermiculite
(5) 50 wt % MgO-50 wt % Vermiculite
(6) 60 wt % MgO-40 wt % Vermiculite
(7) 100 percent MgO (suspended on silica wool)
(8) 100 percent Perlite
(9) 20 wt % MgO-80 wt % Perlite
(10) 35 wt % MgO-65 wt % Perlite
(11) 45 wt % MgO-55 wt % Perlite
(12) 60 wt % MgO-40 wt % Perlite Each of these sorbents was exposed to a humidified simulated flue gas having the following analysis: 2500 ppm SO2, 80 ppm NO, 80 ppm NO2, 5.2% CO2, 1.6% O2 and balance nitrogen at a flow rate of 4 l/min and at a temperature of about 60° C. All beds were seen to remove SO2, NO2 and NO effectively except the 100 percent Vermiculite, 100 percent Perlite, and 100 percent MgO beds. The 100 percent Vermiculite and 100 percent Perlite beds removed essentially no SO2. The 100 percent MgO bed, on the other hand, removed a small percentage of SO2 initially, but soon became mud-like in character and formed a barrier blocking gas flow. The percentages of SO2 removed from the flue gas during a 40-minute test for the various compositions that displayed satisfactory removal are shown in FIG. 1.

Figure 2:
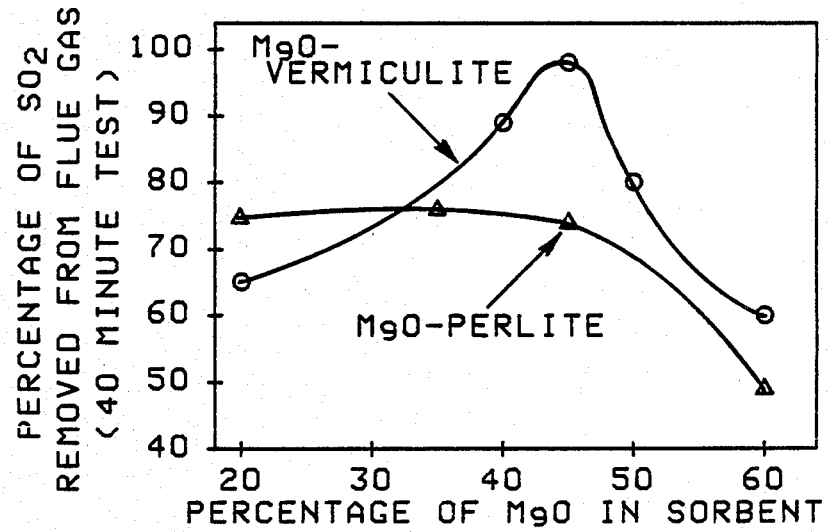
FIG. 2 shows how the sorption performance of regenerated sorbents varies with composition.

These same sorbents were then regenerated in air at 550° C. for 30 minutes. Afterwards they were again exposed to a simulated flue gas. The results of these resorption tests are shown in FIG. 2. In this case, as before, all compositions with MgO contents of 10 to 60 weight percent, removed SO2 effectively, while beds made up of 100 percent Vermiculite, of 100 percent Perlite, and of 100 percent MgO were not effective.

In subsequent tests it was found that even better resorption performance could be attained with MgO-vermiculite and MgO-perlite sorbents when higher regeneration temperatures were employed and when a reducing gas was included in the atmosphere during regeneration.

Reference will now be made to a number of examples which relate to the embodiments of the present invention. Example 1 describes several series of experiments that were performed to show the temperature ranges during which SO2, NO2, and NO are normally expelled during regeneration in various atmospheres. The results showed clearly that NO2 and NO are given off when regeneration is performed in nitrogen or in air, but that no NO2 or NO occurs when regeneration is performed in CO or in methane. Example 2 describes a series of experiments that were performed to evaluate the relative resorption performance of sorbents that wer regenerated in different atmospheres. It was observed that sorbents regenerated in CO and in methane showed superior performance in comparison with other atmospheres. Example 3 describes experiments involving multiple sorption-regeneration cycles, where the advantages of the use of CO, methane, or hydrogen, in comparison with nitrogen or air, were again clearly seen. Example 4 describes experiments demonstrating that as little as 5 percent CO in the atmosphere is effective in achieving excellent performance.

EXAMPLE 1

Figure 3:
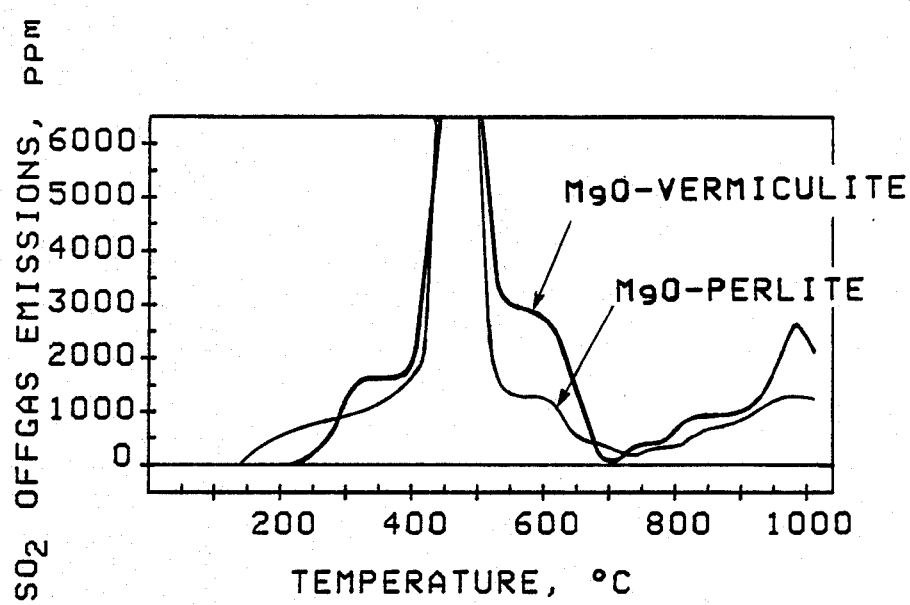
FIG. 3 indicates the temperatures at which SO2 is expelled from spent MgO-vermiculite and spent MgO-perlite sorbents during heating.
Figure 4:
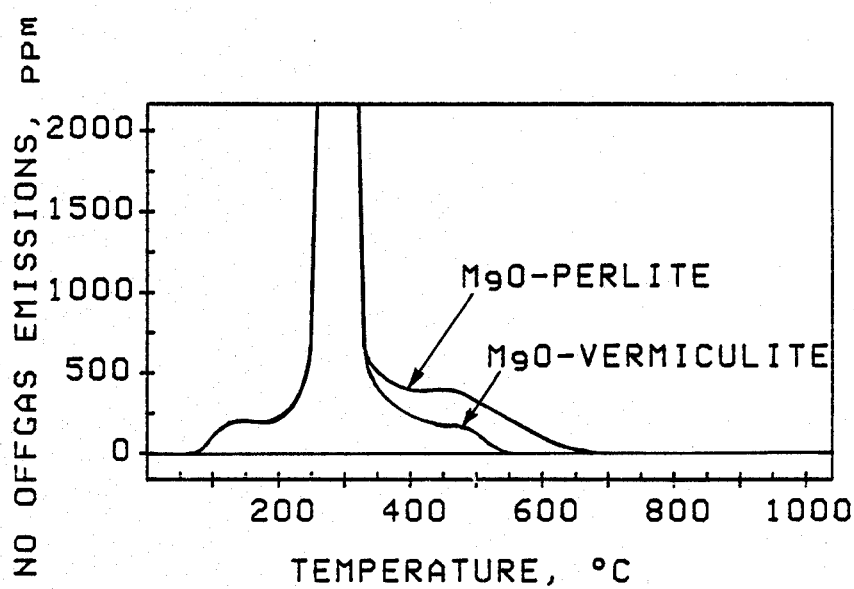
FIG. 4 indicates the temperatures at which NO is expelled from spent sorbents during heating in air or nitrogen.
Figure 5:
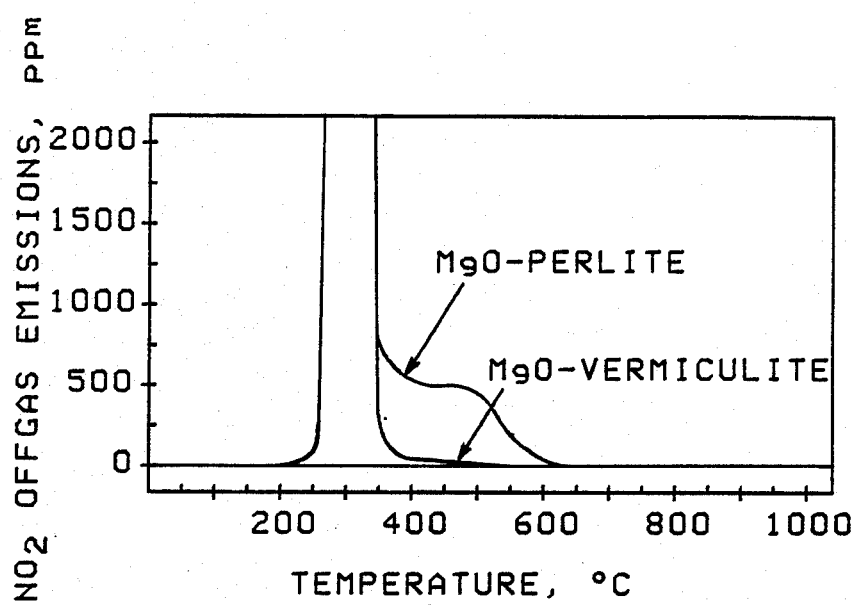
FIG. 5 indicates the temperatures at which NO2 is expelled from spent sorbents during heating in air or nitrogen.

The manners in which SO2, NO2 and NO evolve from spent sorbents during regeneration in air, in nitrogen, in CO and in methane, as a function of temperature was studied in several series of closely controlled experiments. Sorbents were first saturated with SO2, NO2 and NO by exposing them to a simulated flue gas containing 2500 ppm SO2, 80 ppm NO, 80 ppm NO2, 5.2% CO2, 1.6% O2, and balance nitrogen. Individual samples were then heated in flowing air, nitrogen, CO, or methane in a closed system from room temperature to about 1000 C over six-hour periods. The composition of the exiting gases in each case was monitored continuously. Sulfur dioxide emissions, nitrogen dioxide emissions and nitric oxide emissions as a function of temperature for two sorbents, 45 wt % MgO-55 wt % Vermiculite and 45 wt % MgO-55 wt % Perlite, regenerated in nitrogen are shown in FIG. 3, FIG. 4, and FIG. 5, respectively. These results are representative of all results that were obtained when nitrogen or air atmospheres were employed. They showed that essentially all NO2 and NO was released within the temperature range 250° to 350° C. SO2 was released principally within two temperature ranges, 450° to 550° C. (about 90 percent) and 850 to 950 (up to 10 percent). Water was also given off during heating. It evolved during drying at 150° C., and then again at about 220° C. and at 420° C. In separate tests, it was found that regeneration of the sorbents occurred rapidly once they reached the regeneration temperature range. The experiments were repeated with CO and with methane present in the atmosphere. In these cases, $SO_2$ and water were given off as before, but no $NO_2$ or NO was detected in the exiting gas, the $NO_2$ and NO having been reduced by the CO or methane present.

EXAMPLE 2

Figure 6:
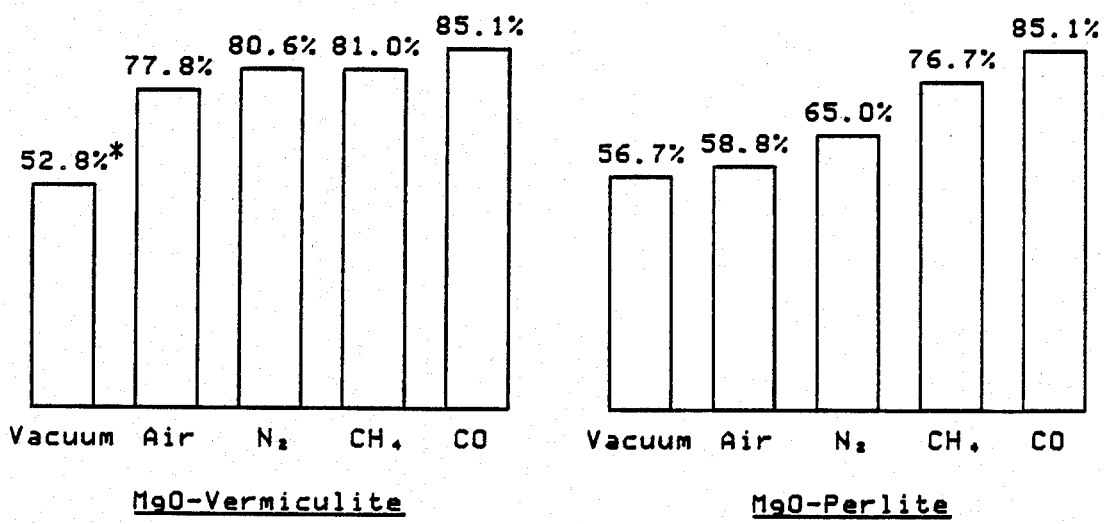
FIG. 6 are graphs showing the relative after-regeneration sorption performance of sorbents regenerated in different atmospheres.

The effects of changes in the nature of the atmosphere employed in regeneration on the performance of sorbents after regeneration were investigated in several additional experiments. In these experiments, partially saturated samples of the 45 wt % MgO-55 wt % Vermiculite and 45 wt % MgO-55 wt % Perlie sorbents were regenerated at 625° C. for 30 minutes in closed systems in five different atmospheres. The atmospheres were vacuum, air, nitrogen, methane and CO. Except for in vacuum tests, a purge gas flow rate of 50 cc per min. was employed in all experiments. FIG. 6 shows the relative performance of the regenerated sorbents during resportion of $SO_2$ from a flue gas of a composition given in Example 1. The values in this Figure indicate the average percentage of $SO_2$ removed from the flue gas during a 30-minute period for 6 g samples. These results show that better regeneration performance occurs when regeneration is performed in a CO or methane atmosphere than in vacuum, air, or nitrogen. In a series of related experiments, the effects of changes in the flow rate of the purge gas on regeneration performance was investigated. Generally speaking, increased performance was observed with increased flow rate up to 700 cc per min.

EXAMPLE 3

Several series of long-term experiments were performed in which sorbents were exposed to up to 16 sorption-regeneration cycles and the performances of the sorbents were monitored during each cycle. Regeneration were performed in air, nitrogen, CO, hydrogen and methane. The results of two series of multiple sorption-regeneration experiments performed on duplicate samples are given in TABLE 1. In the first series of experiments, nitrogen was employed in most regenerations. In the second series of experiments, only CO was used as the regeneration atmosphere. The beneficial use of CO can be seen in the experimental results. Similar results were obtained when methane or hydrogen was used.

TABLE 1

| | | Series 1 | | | |
|---|---|---|---|---|---|
| | | MgO—Vermiculite | | MgO—Perlite | |
| | | Efficiency | Effectiveness | Efficiency | Effectiveness |
| Cycle Number | Regeneration Atmosphere | (% $SO_2$ Being Removed at 20 Min) | (Avg % $SO_2$ Removed During 60 Min Period) | (%) At 20 Min | (%) Avg for 60 Min |
| 1st | N2 | 100.0 | 100.0 | 99.1 | 89.8 |
| 2nd | N2 | 74.4 | 80.7 | 72.2 | 75.6 |
| 3rd | N2 | 65.2 | 66.5 | 65.2 | 71.0 |
| 4th | N2 | 35.4 | 60.6 | 56.0 | 70.4 |
| 5th | N2 | 46.4 | 54.5 | 65.4 | 66.0 |
| 6th | N2 | 45.3 | 48.3 | 48.8 | 62.4 |
| 7th | CO | 84.2 | 91.5 | 72.9 | 76.5 |
| 8th | N2 | 74.8 | 73.6 | 75.0 | 80.7 |
| 9th | N2 | 57.3 | 67.3 | 79.2 | 75.5 |
| 10th | N2 | 22.5 | 42.8 | 25.0 | 46.0 |
| 11th | CO | 87.3 | 87.0 | 98.3 | 77.3 |
| 12th | N2 | 73.3 | 75.9 | 82.5 | 67.2 |
| 13th | N2 | 52.3 | 62.5 | Material began to degrade | |
| 14th | CO | 81.4 | 81.1 | | |
| 15th | CO | 87.9 | 80.7 | | |
| 16th | N2 | 69.8 | 69.5 | | |

| | | Series 2 | |
|---|---|---|---|
| | | MgO—Vermiculite | |
| | | Efficiency | Effectiveness |
| Cycle Number | Regeneration Atmosphere | (%) At 20 Min | (%) Avg for 60 Min |
| 1st | CO | 100.0 | 100.0 |
| 2nd | CO | 100.0 | 100.0 |
| 3rd | CO | 100.0 | 100.0 |
| 4th | CO | 100.0 | 100.0 |

| | |
|---|---|
| Samples Original Wt: | 10.00 g |
| Flue Gas Flow Rate: | 4.5 l/min |
| Sorption Temperature: | Ambient |
| Regeneration Temperature: | 725-750 C. |
| $SO_2$ Level of Flue Gas: | 2100-2400 ppm |

EXAMPLE 4

A series of experiments was also performed in which samples of 45 wt % MgO-55 wt % Vermiculite saturated with $SO_2$ and $NO_x$ were regenerated at 725 C for 30 minutes under different CO-nitrogen purge-gas atmospheres. The objective of these experiments was to determine the minimum level of CO required to obtain good $SO_2$ removal efficiency after regeneration while achieving total or near total destruction of $NO_x$ during regeneration. $SO_2$ removal efficiency, in this case, was measured as the average percentage of $SO_2$ removed from a flue gas by an 8 g sample of sorbent during a 30-minute exposure period. The results of these experiments, shown in TABLE 2, indicate that as little as 5 percent CO in a CO-nitrogen mixture effectively destroys $NO_x$ and improves $SO_2$ removal, in comparison with a pure nitrogen atmosphere.

Several unexpected results occurred when CO, methane, or hydrogen was used in the purge gas. One, the temperature range for complete decomposition of the sulfur-containing compounds in the spent sorbents was lowered from about 900° C., as observed when regeneration is performed in air, nitrogen or vacuum, to about 750° C. This is an extremely important discovery because MgO-vermiculite and MgO-perlite sorbents physically degrade when cycled at temperatures in excess of 900° C. Very little degradation occurs at temperatures below 800° C. Two, when the spent sorbents contained NO2 and NO, these species came off during regeneration and reacted with the CO, methane, or hydrogen present resulting simply in nitrogen, CO2 and/or H2O. This too is an extremely important discovery. It was anticipated that NO2 and NO would come off at the same time as SO2 and that separation of the different species would be difficult.

TABLE 2

| Purge Gas Atmosphere | SO2 Removal Efficiency | NOx Destruction |
| --- | --- | --- |
| 100% N2 | 89.5 | None |
| 5% CO—95% N2 | 95.3 | Almost Total |
| 12.5% CO—87.5% N2 | 99.9 | Total |
| 25% CO—75% N2 | 100.0 | Total |
| 50% CO—50% N2 | 100.0 | Total |
| 100% CO | 100.0 | Total | with NOx and SO2 coming off within different temperature ranges and with the in-process destruction of NOx occurring, no separations are necessary and one must not be concerned about NOx. Three, significant quantities of gaseous elemental sulfur were observed to come off during regeneration, in addition to SO2. This presents the opportunity to collect elemental sulfur as a valuable direct product of the process.

What is claimed is:

1. A regeneration process for MgO-vermiculite and MgO-perlite sorbents employed to remove nitrogen and sulfur oxides from a flue gas comprising the following steps:
   (a) Heating the spent sorbents in air to a temperature in the range of 100° to 350° C. to drive off substantially all free and chemically attached water;
   (b) Further heating the spent sorbents in an atmosphere containing a reducing gas selected from the group consisting of carbon monoxide, metahne and hydrogen to a temperature in the range of 350° to 450° C. to drive off sorbed nitrogen oxides;
   (c) Further heating the spent sorbents in said same atmosphere containing a reducing gas to a temperature in the range of 450° to 700° C. to drive off approximately 90 percent of the sorbed sulfur in the form of sulfur oxides and elemental sulfur and to destroy substantially all nitrogen oxides present in the exit gases;
   (d) Cooling said sorbents to a temperature below 200° C. for reuse.

2. A regeneration process according to claim 1, wherein heating in the said reducing gas-containing atmosphere is extended to a temperature in the range of 700° to 950° C. to drive off substantially all of the remaining sorbed sulfur.

3. A regeneration process according to claim 1 wherein the reducing gas is carbon monoxide comprising greater than 5 percent by weight of the atmosphere.

4. A regeneration process according to claim 1, wherein cooling of said sorbents is performed in air.

5. A regeneration process according to claim 1, wherein the percentage of MgO by weight in the MgO-vermiculite and MgO-perlite sorbents is 10 to 60 percent.

6. A regeneration process according to claim 2, wherein final heating is done at 750 C.

7. A regeneration process for MgO-vermiculite and MgO-perlite sorbents employed to remove nitrogen and sulfur oxides from a flue gas, wherein the percentage of MgO in said sorbents is more than 10 weight percent but less than 60 weight percent of the sorbent comprising the following steps:
   (a) Heating the spent sorbents in air to a temperature in the range of 100° to 350° C. to drive off substantially all free and chemically attached water;
   (b) Further heating the spent sorbents in a second atmosphere containing carbon monoxide comprising more than 5 percent by weight of the atmosphere to a temperature in the range of 350° to 450° C. to drive off sorbed nitrogen oxides;
   (c) Further heating the spent sorbents in said same atmosphere containing carbon monoxide to a temperature in the range of 450° to 700° C. to drive off approximately 90 percent of the sorbed sulfur oxides and to destroy substantially all nitrogen oxides present in the exit gases;
   (d) Cooling said sorbents in air to a temperature below 200° C. for reuse.

8. A regeneration process according to claim 7, wherein heating in said carbon monoxide-containing atmosphere is extended to 750° C. to drive off substantially all of the sorbed sulfur oxides.

* * * * *